United States Patent
Dykstra et al.

(10) Patent No.: US 10,955,581 B2
(45) Date of Patent: Mar. 23, 2021

(54) USING AN ADJUSTED DRIVE PULSE IN FORMATION EVALUATION

(71) Applicant: Halliburton Energy Services, Inc., Houston, TX (US)

(72) Inventors: Jason D. Dykstra, Spring, TX (US); Yiming Zhao, Katy, TX (US); Xingyong Song, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 406 days.

(21) Appl. No.: 15/755,473

(22) PCT Filed: Sep. 17, 2015

(86) PCT No.: PCT/US2015/050764
§ 371 (c)(1),
(2) Date: Feb. 26, 2018

(87) PCT Pub. No.: WO2017/048264
PCT Pub. Date: Mar. 23, 2017

(65) Prior Publication Data
US 2018/0372907 A1    Dec. 27, 2018

(51) Int. Cl.
*G01V 1/36* (2006.01)
*G01V 3/38* (2006.01)
(Continued)

(52) U.S. Cl.
CPC .............. *G01V 3/38* (2013.01); *G01V 1/306* (2013.01); *G01V 1/46* (2013.01); *G01V 1/48* (2013.01);
(Continued)

(58) Field of Classification Search
CPC ... G01V 3/32; G01V 3/36; G01V 3/20; G01V 5/00; G01V 2200/14; G01V 2200/16;
(Continued)

(56) References Cited

U.S. PATENT DOCUMENTS

| 4,594,691 A | 6/1986 | Kimball et al. |
| 5,265,067 A | 11/1993 | Chang |

(Continued)

FOREIGN PATENT DOCUMENTS

| WO | 2015047256 | 4/2015 |
| WO | 2015084361 | 6/2015 |

OTHER PUBLICATIONS

International Search Report and Written Opinion for PCT/US2015/050764 dated Jun. 16, 2016.

(Continued)

*Primary Examiner* — Krystine E Breier
(74) *Attorney, Agent, or Firm* — John Wustenberg; C. Tumey Law Group PLLC (57) ABSTRACT

A method of evaluating a subterranean formation includes conveying a tool along a borehole. The tool includes a transmitter that transmits a drive pulse and a receiver that receives at least one formation response to the drive pulse. The method further includes calculating a signal-to-noise ratio of the at least one formation response and comparing the signal-to-noise ratio to a programmable threshold. The method further includes determining, based on the comparing, an adjusted drive pulse to transmit and transmitting the adjusted drive pulse. The method further includes and receiving at least one formation response to the adjusted drive pulse and deriving formation data from the at least one formation response to the adjusted drive pulse. The method further includes displaying a representation of the formation based on the formation data.

17 Claims, 6 Drawing Sheets

(51) Int. Cl.
*G01V 1/30* (2006.01)
*G01V 1/46* (2006.01)
*G01V 1/48* (2006.01)
*G01V 3/36* (2006.01)
*G01V 3/32* (2006.01)
*G01V 3/26* (2006.01)
*G01V 3/14* (2006.01)
*G01V 3/20* (2006.01)
*G01V 5/00* (2006.01)

(52) U.S. Cl.
CPC .................. *G01V 3/14* (2013.01); *G01V 3/26* (2013.01); *G01V 3/32* (2013.01); *G01V 3/36* (2013.01); *G01V 3/20* (2013.01); *G01V 5/00* (2013.01); *G01V 2200/14* (2013.01); *G01V 2200/16* (2013.01); *G01V 2210/34* (2013.01); *G01V 2210/622* (2013.01); *G01V 2210/6244* (2013.01)

(58) Field of Classification Search
CPC ......... G01V 2210/34; G01V 2210/622; G01V 2210/6244
See application file for complete search history.

(56) References Cited

U.S. PATENT DOCUMENTS

| | | | |
|---|---|---|---|
| 5,654,938 A | 8/1997 | Tang | |
| 5,724,308 A | 3/1998 | Sorrells et al. | |
| 5,808,963 A | 9/1998 | Esmersoy | |
| 6,351,991 B1 | 3/2002 | Shina | |
| 6,366,531 B1 | 4/2002 | Varsamis et al. | |
| 6,624,629 B1* | 9/2003 | Speier | G01V 3/32 324/303 |
| 6,661,737 B2 | 12/2003 | Wisniewski et al. | |
| 6,772,067 B2 | 8/2004 | Blanch et al. | |
| 7,623,412 B2 | 11/2009 | Pabon et al. | |
| 7,668,043 B2 | 2/2010 | Wu | |
| 8,102,732 B2 | 1/2012 | Pabon et al. | |
| 8,547,788 B2 | 10/2013 | Wang et al. | |
| 8,797,825 B2 | 8/2014 | Mickael | |
| 8,861,307 B2 | 10/2014 | Pabon | |
| 10,001,581 B2* | 6/2018 | Viassolo | G01V 3/20 |
| 10,344,571 B2* | 7/2019 | Wu | E21B 49/00 |
| 2003/0114989 A1 | 6/2003 | Blanch et al. | |
| 2003/0123326 A1 | 7/2003 | Wisniewski et al. | |
| 2005/0226098 A1* | 10/2005 | Engels | G01V 1/46 367/31 |
| 2005/0257610 A1* | 11/2005 | Gillen | G01V 3/32 73/152.02 |
| 2006/0092802 A1 | 5/2006 | Chang et al. | |
| 2011/0071762 A1 | 3/2011 | Hagiwara | |
| 2013/0093422 A1 | 4/2013 | Morys et al. | |
| 2014/0029382 A1 | 1/2014 | Donderici et al. | |

OTHER PUBLICATIONS

SPS-DARTS 2005 "Optimization of the Driving Signal of an Ultrasonic Transducer Using a Genetic Algorithm" by Vlasma et al. dated 2005.
European Search Report for Application No. 15904257.1 dated Jun. 14, 2018.

* cited by examiner

USING AN ADJUSTED DRIVE PULSE IN FORMATION EVALUATION

BACKGROUND

The gathering of downhole information has been performed by the oil and gas industry for many years. Modern drilling and production operations demand a great quantity of information relating to the parameters and conditions downhole. Such information typically includes the location and orientation of the bottomhole assembly, earth formation properties, and drilling environment parameters downhole. The gathering of information relating to formation properties and conditions downhole is commonly referred to as "logging," and can be performed during drilling itself.

Various measurement tools exist for use in logging operations such as acoustic tools, imaging tools, nuclear magnetic resonance (NMR) tools, resistivity tools, and the like. Acoustic tools typically measure the transit of seismic waves throughout the formation, while imaging tools result in high-resolution images for geological and structural classification, sedimentary analysis, and bit steering. NMR tools usually measure formation porosity and fluid saturation, and resistivity tools compare amplitudes and/or phases of reflected signals to measure the formation resistivity.

These tools transmit signals into the formation and receive responses to the transmitted signals, which are then processed to extract useful data about the surrounding formation. The tools generate a drive pulse, or drive signal, for transmission, but the drive pulses are not optimized in a fashion that accounts for the environmental characteristics such as formation composition, borehole size, borehole fluid, and the like. For example, the magnitude of the drive pulse may be greater than necessary to extract useful data from the responses because the formation characteristics are relatively predictable. As such, any increase in magnitude may not increase the quantity, kind, or quality of the extracted data. In this example, resources are diverted to generating the overly powerful drive pulse that would be better spent elsewhere.

BRIEF DESCRIPTION OF THE DRAWINGS

Accordingly, systems and methods using an adjusted drive pulse in formation evaluation are disclosed herein. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

Figures 1, 2:
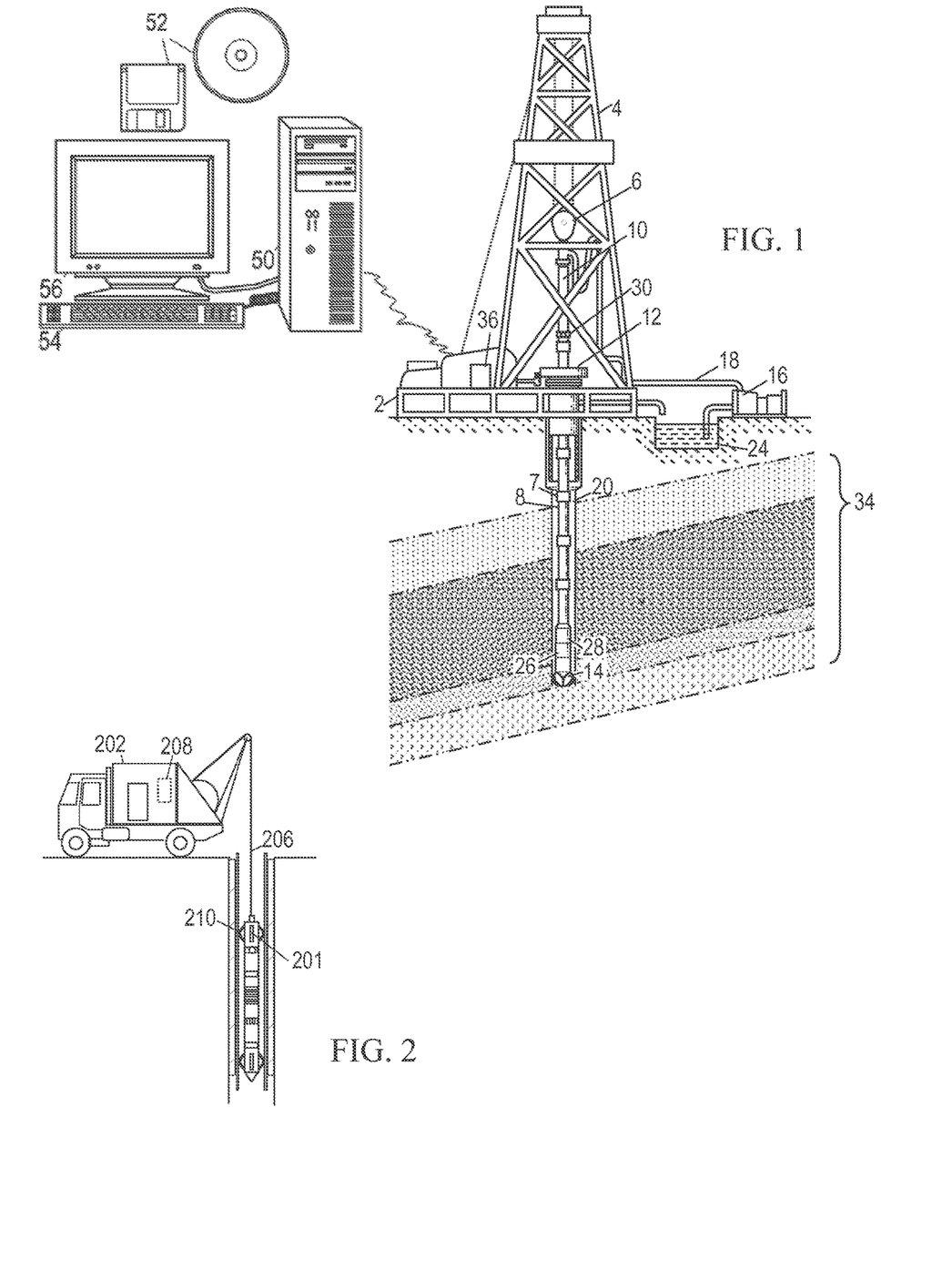
FIG. 1 is a contextual view of a logging while drilling environment.
FIG. 2 is a contextual view of a wireline environment.

The issues identified in the background are at least partly addressed by systems and methods using an adjusted and optimized drive pulse in formation evaluation. The disclosed systems and methods for using such drive pulses are best understood in terms of the context in which they are employed. As such. FIG. 1 shows a well during drilling operations. A drilling platform 2 is equipped with a derrick 4 that supports a hoist 6. Drilling of the well is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling is accomplished by rotating the drill string 8, by use of a downhole motor near the drill bit 14, or by both methods.

Drilling fluid, termed mud, is pumped by mud recirculation equipment 16 through a supply pipe 18, through the drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling (LWD) environment, downhole sensors 26 are located in the drillstring 8 near the drill bit 14. The sensors 26 may include navigational instrumentation that measures the position and orientation of the downhole sensors 26.

In some embodiments, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50. The data processing system 50 includes internal data storage and memory having software (represented by removable information storage media 52), along with one or more processor cores that execute the software. The software configures the system to interact with a user via one or more input/output devices (such as a keyboard 54 and display 56). Among other things, the system 50 processes data received from the acquisition module 38 and generates a representative display. Processing system 50 may further derive drive pulse adjustments from the data to enhance measurement signal-to-noise ratio (SNR) when it falls below a predetermined threshold.

FIG. 2 shows a contextual view of an illustrative wireline embodiment. A logging truck 202 may suspend a wireline logging tool 201 on a wireline cable 206 having conductors for transporting power to the tool 201 and telemetry from the tool 201 to the surface. On the surface, a computer 208 acquires and stores measurement data from the tool 201 as a function of position along the borehole and as a function of azimuth. (Directional instrumentation in tool 201 tracks the tool orientation.) With respect to FIG. 2, the use of the tool 201 is described using one orientation and one depth for clarity. However, the tool 201 may operate at multiple depths as the tool 201 is conveyed along the borehole. Also, the tool 201 may be rotated within the borehole to obtain measurements in any azimuthal direction. In this way, a multi-dimensional representation of the surrounding formation may be obtained, processed, and displayed.

Centralizers 210 keep the tool 201 centered within the borehole. In order to obtain more information about the formation in a single logging trip, multiple logging tools may be included in a single tool string. For example, a tool string may include an acoustic tool, an imaging tool, a nuclear magnetic resonance (NMR) tool, a resistivity tool, and the like. The wireline tool 201 may further include a control/telemetry module for coordinating the operations of the various tools and communications between the various instruments and the surface as described with respect to FIG. 3.

Figure 3:
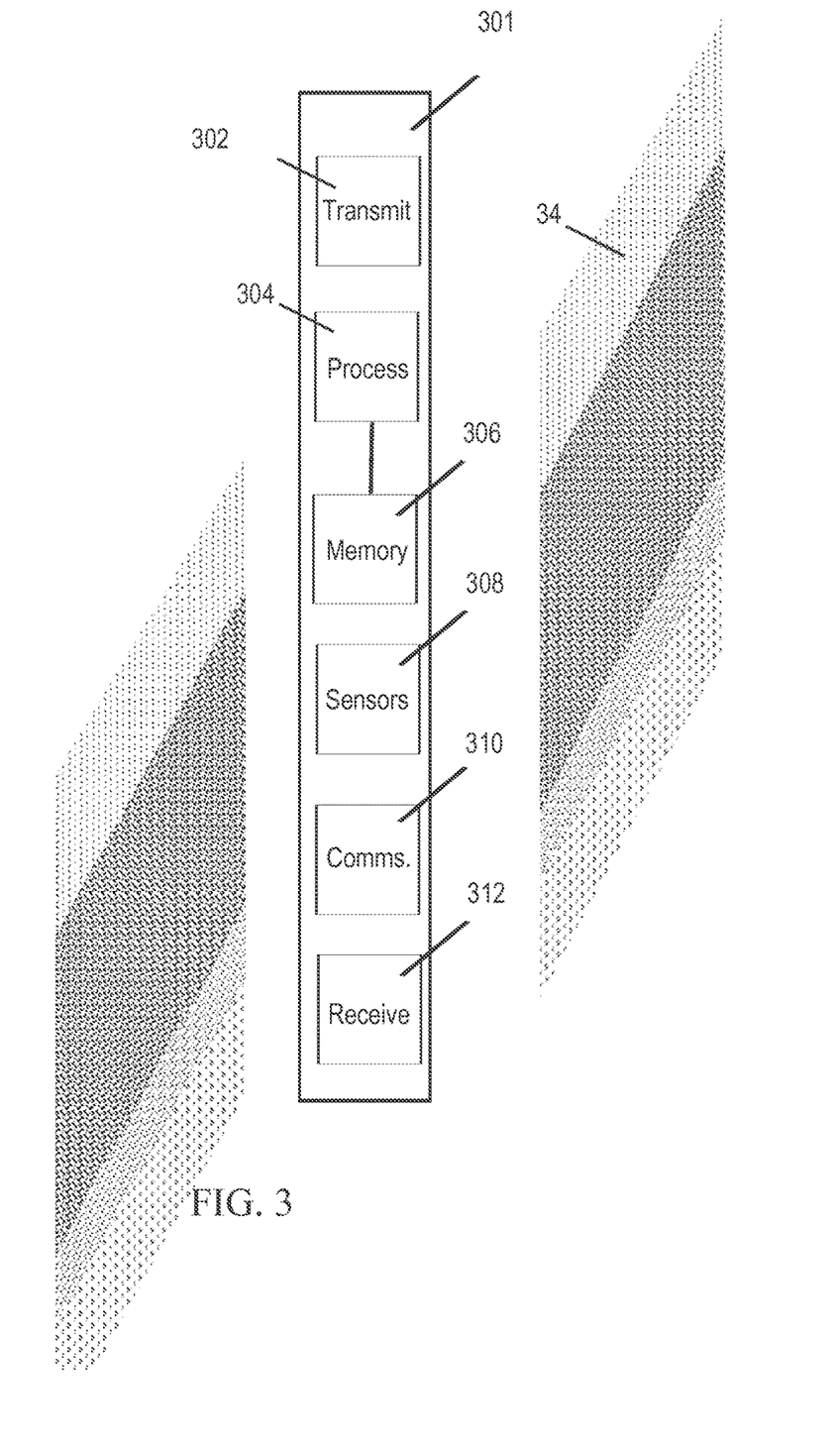
FIG. 3 is a functional block diagram of an illustrative tool for evaluating a subterranean formation.

FIG. 3 is a block diagram of an illustrative sonic logging tool 301 in an uncased portion of the borehole for evaluating a subterranean formation 34. The tool 301 includes one or more transmitters 302 to transmit a drive pulse and one or more receivers 312 to receive responses to the drive pulse. The transmitters 302 and receivers 312 may be implemented as piezoelectric transducers, which covert electrical pulses to acoustic energy and acoustic energy to electrical pulses. The tool 301 further includes a processor 304, coupled to memory 306, to process operations, store data, and determine an adjusted drive pulse to transmit based on a characteristic of the formation as described further below. The tool 301 also includes a sensor module 308 and a communication module 310. The sensor module 308 includes depth sensors, orientation sensors, temperature sensors, pressure sensors, and the like, that collect downhole measurements as a function of time. The data collected by these sensors may be associated with the signals transmitted and received by the transmitters 302 and receivers 312 respectively. For example, the received signal may be associated with downhole data corresponding to the time the signal was received. When associated, the collected measurements may provide additional context for interpreting and processing the signals.

The communication module 310 includes communication and networking hardware for enabling communications between the tool 301 and the surface. The communication channel between the tool 301 and the surface may be wired. While conveying the tool 301 along the borehole, an adjusted drive pulse may be determined by the processor 304 and a representation of the formation based on the adjusted drive pulse may be output for display by the processor 304 as described below.

Figure 4:
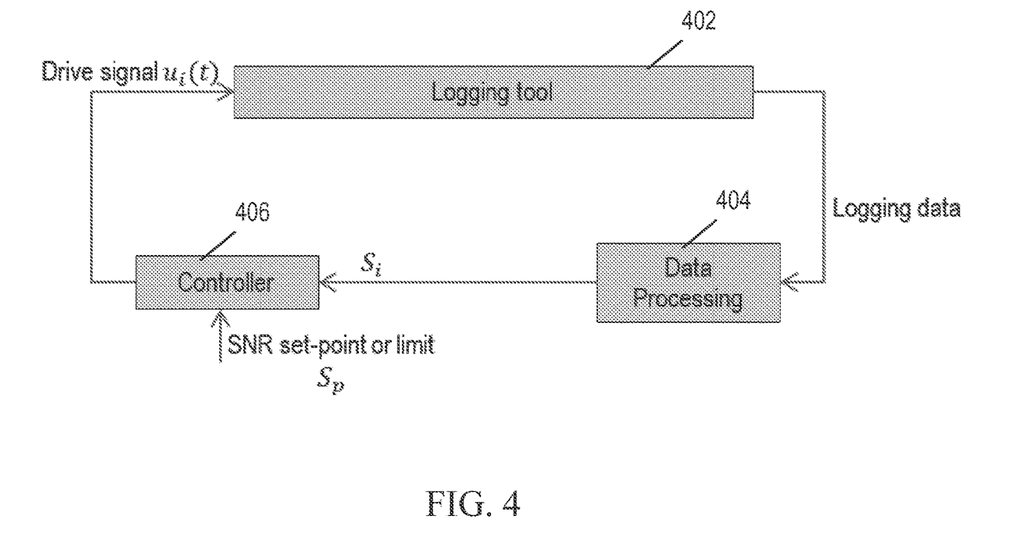
FIG. 4 is a signal flow diagram for an illustrative drive pulse optimization system.

FIG. 4 is a signal flow diagram for an illustrative drive pulse optimization system. During logging, a downhole logging tool 402 is configured by controller 406 to use a drive signal $u_i(t)$ for driving its transmitter and thereby generating a transmit signal. Index i is an integer denoting the current iteration number or cycle number, and the drive signal u is a function of time denoted by t. The transmit signal enters the formation, responsively inducing a formation response that is detected by the receiver(s) and is recorded by the logging tool 402 as logging data.

The logging data is output from the logging tool 402 and input to a data processing module 404. The data processing module 404 processes the logging data and obtains characteristics of the formation based on the logging data. Moreover, the data processing module measures the amount of noise in the logging data and uses it to estimate the signal to noise ratio (SNR) of the logging data. The SNR for the ith cycle, $S_i$, is output by the data processing module 404 and used as input by a controller 406. The controller 406 compares $S_i$ to $S_p$, which is a programmable SNR threshold. If $S_i$ is greater than $S_p$, the controller 406 decreases the magnitude of the drive signal for the next cycle $u_{i+1}(t)$. If $S_i$ is less than $S_p$, the controller 406 increases the magnitude of the drive signal or, if the magnitude is near a predetermined limit, the controller 406 adjusts another drive signal characteristic for the next cycle $u_{i+1}(t)$. Examples of other drive signal characteristics that may be adjusted include frequency, bandwidth, and wave shape. In this way, the drive signal is adjusted or optimized based on characteristics of the formation. As such, excess resources are not diverted to maintaining an overly powerful drive signal, but useful data can still be extracted from the formation responses. By using more than one threshold and operators, a set of rules may govern the optimization of the drive signal.

In at least one embodiment, a drive signal template, $\bar{u}(t)$, is used to generate the drive signal, $u_i(t)$, using the following update rule:

$$u_i(t) = K_i \bar{u}(t) \quad (1)$$

where $$K_i = K_{i-1} + k_p \left[ \left(1 + \frac{1}{T_i} + T_d\right)(S_i - S_p) - (1 + 2T_d)(S_{i-1} - S_p) + T_d(S_{i-2} - S_p) \right],$$

and $k_p$, $T_d$ and $T_i$ are programmable constants. In another embodiment, a collection of drive signals are stored in memory, and the drive signal is selected from the collection based on the SNR and previous drive signal.

Figure 5:
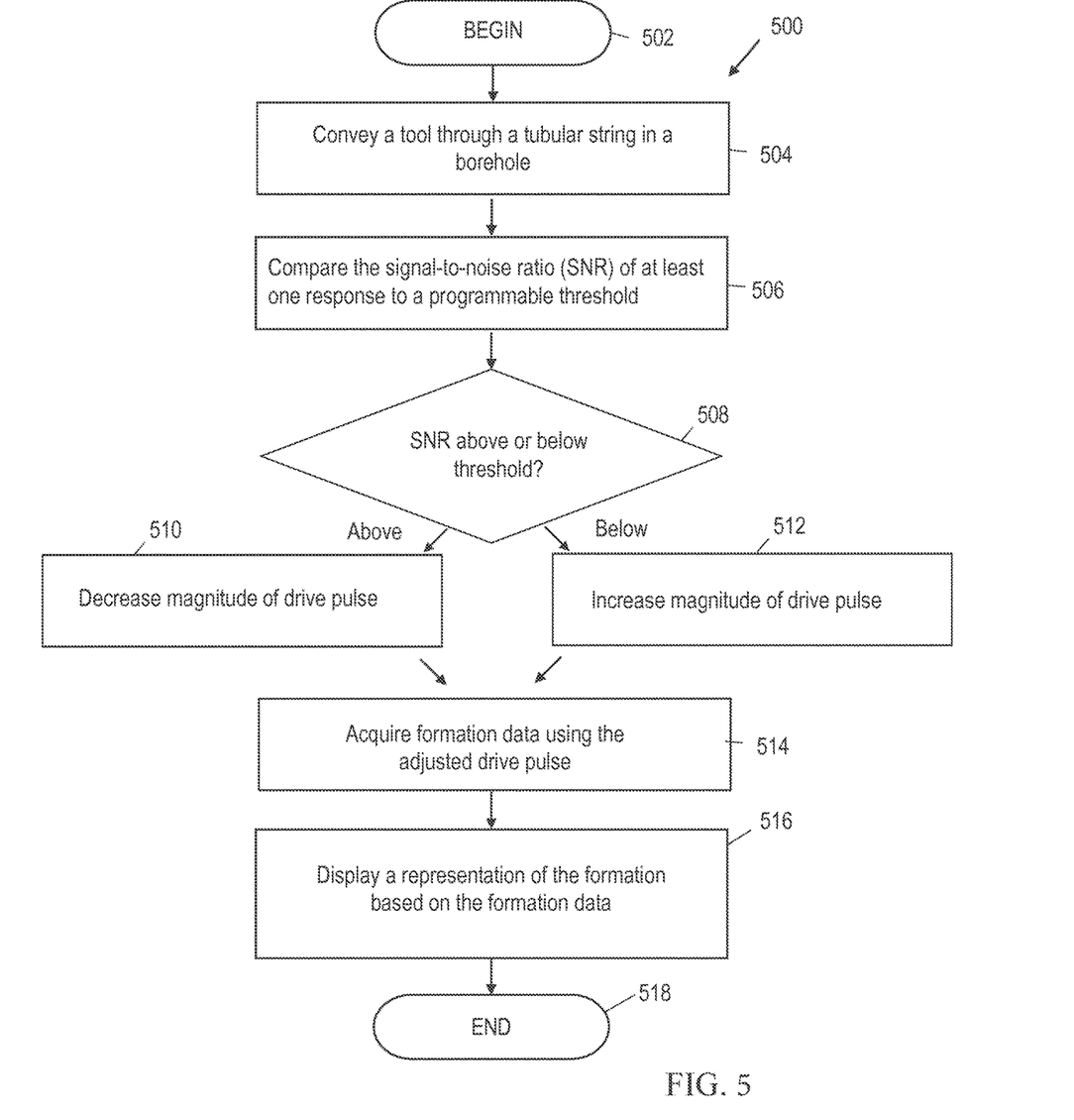
FIG. 5 is a flow diagram of an illustrative method for evaluating a subterranean formation.

FIG. 5 illustrates a method 500 of evaluating a subterranean formation beginning at 502 and ending at 518. At 504, a tool is conveyed in a borehole. The tool includes a transmitter that transmits a drive pulse and a receiver that receives responses to the drive pulse. At 506, a metric of performance is calculated based on a formation response, and the metric of performance is compared with a programmable threshold. For example, the metric of performance may be SNR, signal repeatability, bias from a stored historical data set, local signal peak within a time window, frequency and magnitude characteristics of the signal, statistical properties of the signal, or the transformability of the generated signal to the output signal. Considering the SNR, the SNR of the responses are compared to a programmable threshold. The SNR of the responses may be calculated, e.g., by comparing contemporaneous responses to an average response and summing the squared error to estimate noise energy. The average response may be squared and integrated to estimate signal energy. The ratio of estimated signal energy to estimated noise energy yields an estimate of SNR, a unitless value that may be expressed in decibels.

At 508, if the SNR is above the threshold, then the magnitude of the next drive pulse is decreased at 510. If the SNR is below the threshold, then the magnitude of the next drive pulse is increased at 512. In other embodiments, the next drive pulse may be adjusted in other ways based on other formation characteristics. For example, the timing, frequency, duration, etc. of the drive pulse may be adjusted based on SNR or on other measures of formation composition, conductivity, porosity, slowness, and the like. The comparison and adjustment process may be iterated as desired.

Historical and/or reference data may be accessed in order to determine the initial adjustments for the drive pulse. For example, historical data about the characteristics of the formation as captured from tools inserted into the borehole at a previous time may be accessed to determine the formation characteristics for which the drive signal is optimized. Also, reference data may about the characteristics of the formation as captured by tools inserted into other nearby boreholes may be accessed for similar reasons. The adjusted drive pulse may be determined based on the historical or reference data.

At 514, the adjusted drive pulse is transmitted, and formation data is extracted from the responses. At 516, a representation of the formation is displayed based on the formation data. In at least one embodiment, the formation data is mapped to a particular domain of interest and is presented as a graph, chart, or table as desired. Additional information can also be encoded into the mapping using line thickness, color, shape, size, and the like.

Figure 6:
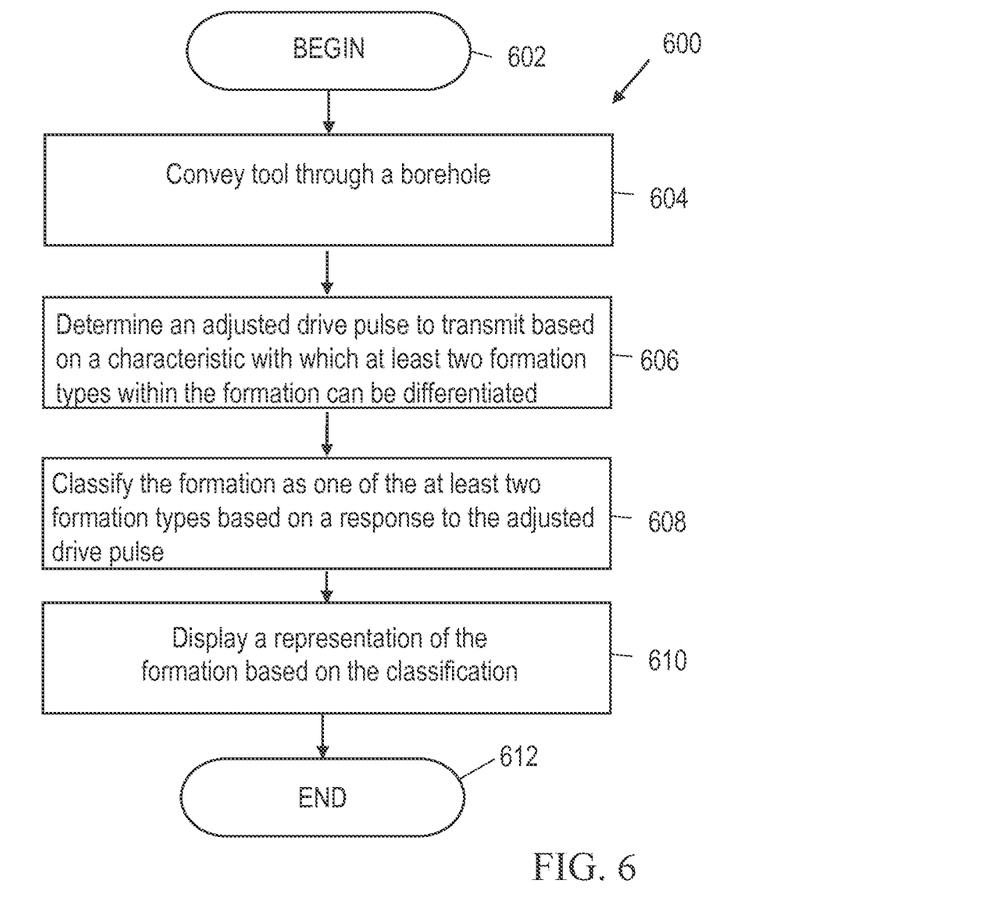
FIG. 6 is a flow diagram of an alternative illustrative method for evaluating a subterranean formation.
Figure 7:
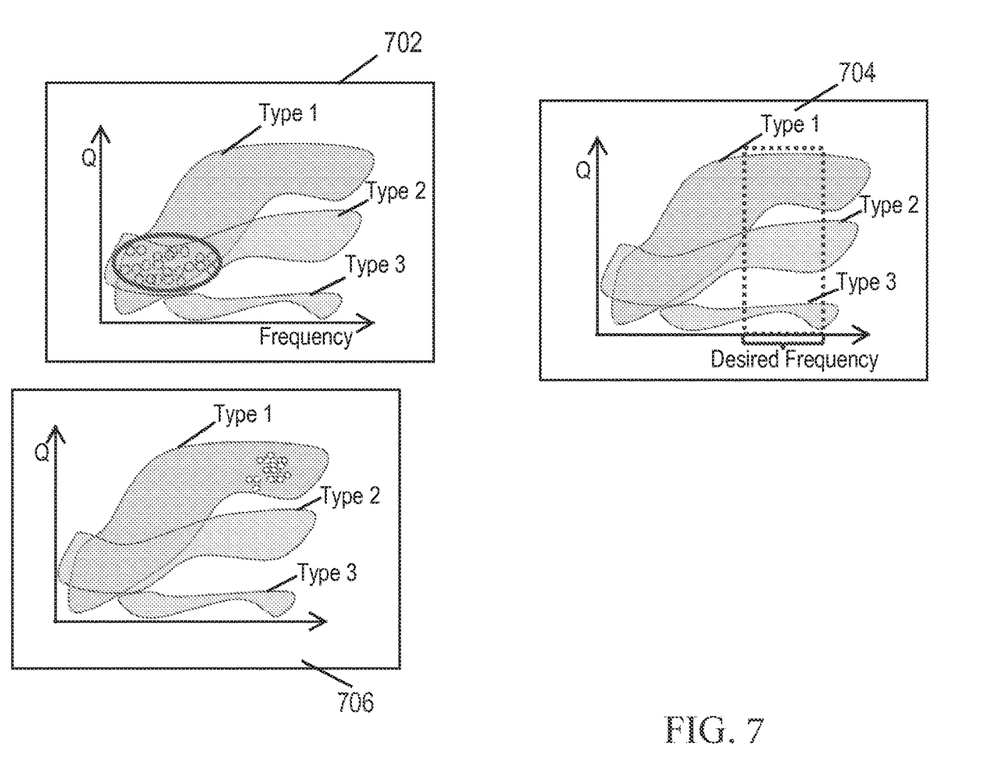
FIG. 7 includes graphs highlighting different aspects of a formation property cluster diagram.

FIG. 6 illustrates a method 600 of evaluating a subterranean formation beginning at 602 and ending at 612, and FIG. 7 shows an illustrative formation property cluster diagram highlighted in three different ways to illustrate one embodiment of the method 600. At 604, a tool is conveyed along a borehole. The tool includes a transmitter that transmits a drive pulse having a broad bandwidth or multiple frequencies, and a receiver that receives one or more formation responses to the drive pulse. At graph 702, the formation property derived from the responses, Q, is plotted as a function of the frequency. Here, Q represents the slowness of the formation, i.e., the inverse of the speed at which the acoustic signal travels through the formation, but in other embodiments Q represents other characteristics of the formation such as conductivity or porosity. When compared with the known slowness distribution of three types of material, type 1; type 2; and type 3, the responses indicate that the formation is not a type 3 formation because none of the plotted responses are comparable to responses expected from a type 3 formation, represented by an enclosed area in the graph. However, the responses are comparable to response expected from a type 1 or type 2 formation because the plotted responses lie within the type 1 and type 2 enclosed areas of the graph. Using these responses, it is not possible to determine whether the formation is a type 1 or type 2 formation.

At 606, an adjusted drive pulse is determined based on a characteristic with which at least two formation types within the formation can be differentiated. Graph 704 illustrates that the type 1 and type 2 formations can be differentiated based on their slowness as measured at higher frequencies. Specifically, the enclosed areas representing type 1 and type 2 formations do not overlap at high frequencies. As such, the drive pulse is adjusted to be within the range at which the two types of formations can be differentiated. Thus, if the processing module determines that the measured formation properties are insufficiently distinguishing between different formation types, the processing module may adjust the drive pulse frequency or bandwidth to attempt measurements that do adequately distinguish the different formation types. This adjustment may be informed by a library of formation type data derived from historical or reference data as described above.

At 608, after the drive pulse has been properly adapted, the formation is classified as one of the at least two formation types based on responses to the adjusted drive pulse. In graph 706, the formation properties measured with the adjusted and higher frequency drive pulse are plotted. The plotted points indicated that the formation type under measurement is a type 1 formation because the points lie within the type 1 enclosure but not within the type 2 enclosure on the graph At 610, a representation of the formation is displayed based on the responses to the adjusted drive pulse. In at least one embodiment, the data is mapped to a particular domain of interest and is presented as a graph, chart, or table as desired. Additional information can also be encoded into the mapping using line thickness, color, shape, size, and the like.

The material of the formations are not the only characteristic by which they may be differentiated. Rather, the method described above may be generalized to other characteristics that can be differentiated based on adjusted drive pulses.

In at least one embodiment, a method of evaluating a subterranean formation includes conveying a tool along a borehole. The tool includes a transmitter that transmits a drive pulse and a receiver that receives at least one formation response to the drive pulse. The method further includes calculating a signal-to-noise ratio of the at least one formation response and comparing the signal-to-noise ratio to a programmable threshold. The method further includes determining, based on the comparing, an adjusted drive pulse to transmit and transmitting the adjusted drive pulse. The method further includes and receiving at least one formation response to the adjusted drive pulse and deriving formation data from the at least one formation response to the adjusted drive pulse. The method further includes displaying a representation of the formation based on the formation data.

In another embodiment, a method of evaluating a subterranean formation includes conveying a tool through a tubular string in a borehole. The tool includes a transmitter that transmits a drive pulse and a receiver that receives one or more responses to the drive pulse. The method further includes determining an adjusted drive pulse to transmit based on a characteristic with which at least two formation types within the formation can be differentiated. The method further includes classifying the formation as one of the at least two formation types based on a response to the adjusted drive pulse. The method further includes displaying a representation of the formation based on the classification.

In another embodiment, an apparatus for evaluating a subterranean formation includes a transmitter to transmit a drive pulse when in a tubular string and a receiver to receive at least one response to the drive pulse. The apparatus further includes a processor to determine an adjusted drive pulse to transmit based on a characteristic with which at least two formation types within the formation can be differentiated.

The following features may be incorporated into the various embodiments. A magnitude of the adjusted drive pulse may be set to be lower than a magnitude of the drive pulse if the signal-to-noise ratio is above the threshold. A magnitude of the adjusted drive pulse may be set to be higher than a magnitude of the drive pulse if the signal-to-noise ratio is below the threshold. Contemporaneous responses may be compared to an average response. The comparing and determining may be iterated with an updated signal-to-noise ratio. A record of drive pulses may be accessed and a drive pulse in the record may be selected as the adjusted drive pulse based on the comparing. The value of $$K_{i-1} + k_p \left[ \left( 1 + \frac{1}{T_i} + T_d \right)(S_i - S_p) - (1 + 2T_d)(S_{i-1} - S_p) + T_d(S_{i-2} - S_p) \right]$$

may be determined, wherein $S_i$ includes a signal-to-noise ratio and $S_p$ is a programmable signal-to-noise ratio threshold. A characteristic may be selected from the group consisting of conductivity, porosity, and slowness. Two formation types may include two formation materials. A record of frequency responses from two materials the same as, or substantially similar to, the two formation materials may be accessed. The frequency of the adjusted drive pulse may be set to a frequency in the record that is associated with two differentiable frequency responses from the two materials. A record of formation data from a neighboring borehole may be accessed. A processor may access a record of frequency responses from materials substantially similar to or the same as the two formation materials. A processor may set the frequency of the adjusted drive pulse to a frequency in the record that is associated with two differentiable frequency responses from the two materials. A processor may access a record of formation data from a neighboring borehole. A processor may access a record of formation data from another tool.

While the present disclosure has been described with respect to a limited number of embodiments, those skilled in the art will appreciate numerous modifications and variations therefrom. It is intended that the appended claims cover all such modifications and variations.

What is claimed is:

1. A method of evaluating a subterranean formation comprising:
   conveying a tool along a borehole, the tool comprising a transmitter that transmits a drive pulse, the tool further comprising a receiver that receives at least one formation response to the drive pulse;
   calculating a metric of performance based on the formation response;
   comparing the metric of performance with a programmable threshold;
   determining an adjusted drive pulse, $K_i$, comprises determining the value of $$K_{i-1} + k_p \left[ \left( 1 + \frac{1}{T_i} + T_d \right)(S_i - S_p) - (1 + 2T_d)(S_{i-1} - S_p) + T_d(S_{i-2} - S_p) \right],$$

wherein $S_i$ comprises a signal-to-noise ratio, $S_p$ is a programmable signal-to-noise ratio threshold, and $k_p$, $T_i$, $T_d$ are programmable constants; and
   transmitting the adjusted drive pulse.

2. The method of claim 1, wherein the metric of performance is selected from the group consisting of signal to noise ratio, signal repeatability, bias from a stored historical data set, local signal peak within a time window, frequency and magnitude characteristics of the signal, statistical properties of the signal, and the transformability of the generated signal to an output signal.

3. The method of claim 1, wherein the metric of performance is signal to noise ratio, and wherein determining the adjusted drive pulse comprises setting a magnitude of the adjusted drive pulse to be lower than a magnitude of the drive pulse if the signal-to-noise ratio is above the threshold.

4. The method of claim 1, wherein the metric of performance is signal to noise ratio, and wherein determining the adjusted drive pulse comprises setting a magnitude of the adjusted drive pulse to be higher than a magnitude of the drive pulse if the signal-to-noise ratio is below the threshold.

5. The method of claim 1, further comprising iterating the comparing and determining with an updated metric of performance.

6. The method of claim 1, wherein determining the adjusted drive pulse comprises accessing a record of drive pulses and selecting a drive pulse in the record as the adjusted drive pulse based on the comparing.

7. The method of claim 2, further comprising determining an initial adjustment for the drive pulse based in part on a stored historical data set.

8. A method of evaluating a subterranean formation comprising:
   conveying a sonic logging tool along a borehole, the tool comprising:
      a transmitter configured to transmit a drive pulse, and
      a receiver configured to receive at least one formation response to the drive pulse;
   calculating a signal to noise ratio from recorded logging data of the at least one formation response;
   comparing the signal to noise ratio with a programmable threshold;
   comprising transmitting the drive pulse based on a drive signal template: $u_i(t) = K_i \bar{u}(t)$ where $u_i(t)$ is the drive pulse of an ith cycle, $\bar{u}(t)$ is the drive signal template, and $K_i$ is an adjusted drive pulse of the ith cycle;
   adjusting the drive pulse of the ith cycle with the model:

$$K_{i-1} = K_{i-1} + k_p \left[ \left( 1 + \frac{1}{T_i} + T_d \right)(S_i - S_p) - (1 + 2T_d)(S_{i-1} - S_p) + T_d(S_{i-2} - S_p) \right],$$

wherein $S_i$ is a signal to noise ratio of the ith cycle, $S_p$ is a programmable threshold, and $k_p$, $T_i$, $T_d$ are programmable constants; and
   transmitting an adjusted drive pulse.

9. The method of claim 8, further comprising adjusting magnitude of the drive pulse by increasing the magnitude of the drive pulse if the signal to noise ratio is below the programmable threshold.

10. The method of claim 8, further comprising adjusting the magnitude of the drive pulse by decreasing the magnitude of the drive pulse if the signal to noise ratio is above the programmable threshold.

11. The method of claim 8, selecting the drive pulse from a stored collection of drive pulses based on the signal to noise ratio.

12. The method of claim 8, further comprising determining an initial adjustment for the drive pulse based in part on a stored historical data set.

13. An apparatus for evaluating a subterranean formation comprising:
- a transmitter configured to transmit a drive pulse along a borehole;
- a receiver configured to receive at least one formation response to the drive pulse; and
- a controller configured to select the drive pulse from a stored collection of drive pulses based on the signal to noise ratio and adjust the drive pulse based on a comparison of a metric of performance with a programmable threshold.

14. The apparatus of claim 13, wherein the metric of performance is selected from the group consisting of signal repeatability, bias from a stored historical data set, local signal peak within a time window, frequency and magnitude characteristics of the signal, statistical properties of the signal, and the transformability of the generated signal to an output signal.

15. The apparatus of claim 13, wherein the controller is further configured to increase a magnitude of the drive pulse if the metric of performance is below the programmable threshold.

16. The apparatus of claim 13, wherein the controller is further configured to decrease a magnitude of the drive pulse if the metric of performance is above the programmable threshold.

17. A method of evaluating a subterranean formation comprising:
- conveying a sonic logging tool along a borehole, the tool comprising:
  - a transmitter configured to transmit a drive pulse, and
  - a receiver configured to receive at least one formation response to the drive pulse;
- calculating a signal to noise ratio from recorded logging data of the at least one formation response;
- comparing the signal to noise ration with a programmable computer; selecting the drive pulse from a stored collection of drive pulses based on the signal to noise ratio; and transmitting the drive pulse.

* * * * *